United States Patent
Cadarette et al.

(10) Patent No.: US 11,392,609 B2
(45) Date of Patent: *Jul. 19, 2022

(54) SUPPLEMENTING CHANGE STREAMS

(71) Applicant: International Business Machines Corporation, Armonk, NY (US)

(72) Inventors: Paul M. Cadarette, Hemet, CA (US); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,840

(22) Filed: Apr. 18, 2017

(65) Prior Publication Data
US 2017/0286515 A1    Oct. 5, 2017

Related U.S. Application Data

(63) Continuation of application No. 15/090,634, filed on Apr. 5, 2016.

(51) Int. Cl.
*G06F 16/27* (2019.01)
*H04L 67/10* (2022.01)

(52) U.S. Cl.
CPC ............. *G06F 16/27* (2019.01); *H04L 67/10* (2013.01)

(58) Field of Classification Search
CPC ....... G06F 16/2343; G06F 16/27; H04L 67/10
See application file for complete search history.

(56) References Cited

U.S. PATENT DOCUMENTS

| | | | |
|---|---|---|---|
| 6,622,152 B1 | 9/2003 | Sinn et al. | |
| 7,031,974 B1 | 4/2006 | Subramaniam | |
| 7,809,691 B1 * | 10/2010 | Karmarkar | G06F 11/1469 |
| | | | 707/674 |
| 8,352,425 B2 | 1/2013 | Bourbonnais | |
| 8,589,346 B2 | 11/2013 | Lu | |
| 8,756,192 B2 | 6/2014 | Wang | |
| 8,886,601 B1 | 11/2014 | Landau et al. | |
| 9,213,706 B2 | 12/2015 | Long | |
| 9,456,014 B2 | 9/2016 | Luo | |
| 9,547,659 B1 | 1/2017 | Barber | |

(Continued)

OTHER PUBLICATIONS

Appendix P, List of IBM Patents or Patent Applications Treated as Related, 2 pages, dated Apr. 18, 2017.

(Continued)

*Primary Examiner* — Usmaan Saeed
*Assistant Examiner* — David M Nafziger
(74) *Attorney, Agent, or Firm* — Nicholas L. Cadmus; Aaron N. Pontikos; Gilbert Harmon, Jr.

(57) ABSTRACT

Aspects of the present invention disclose a method, computer program product, and system for analyzing change stream data. The method includes identifying, by one or more computer processors, a list of changes in a replication stream. The method further includes determining, by one or more computer processors, if one or more changes in the list of changes matches a criteria for a hint. The method further includes in response to determining that one or more of the changes in the list of changes matches the criteria for a hint, inserting, by one or more computer processors, the hint into the list of changes prior to a first change of the one or more changes that triggers a match in criteria.

7 Claims, 3 Drawing Sheets

(56) References Cited

U.S. PATENT DOCUMENTS

| | | | |
|---|---|---|---|
| 9,767,178 B2* | 9/2017 | Srivastava | G06F 11/14 |
| 10,545,943 B2 | 1/2020 | Cadarette | |
| 10,599,633 B2 | 3/2020 | Cadarette | |
| 2001/0044795 A1 | 11/2001 | Cohen | |
| 2002/0029209 A1 | 3/2002 | Bernal | |
| 2006/0047713 A1 | 3/2006 | Gornshtein | |
| 2008/0016300 A1* | 1/2008 | Yim | G06F 11/2064 711/162 |
| 2009/0157764 A1* | 6/2009 | Kundu | G06F 16/2443 |
| 2009/0216809 A1 | 8/2009 | Horii | |
| 2010/0146245 A1* | 6/2010 | Yildiz | G06F 9/5027 712/E9.016 |
| 2011/0173619 A1 | 7/2011 | Fish | |
| 2012/0054533 A1* | 3/2012 | Shi | G06F 11/2097 714/48 |
| 2012/0072470 A1* | 3/2012 | Joseph | G06F 16/24552 711/143 |
| 2012/0136827 A1* | 5/2012 | Wang | G06F 11/2097 707/623 |
| 2012/0136830 A1* | 5/2012 | Patocka | G06F 11/2074 707/637 |
| 2012/0151003 A1 | 6/2012 | Murray | |
| 2012/0278282 A1 | 11/2012 | Lu | |
| 2014/0040203 A1 | 2/2014 | Lu | |
| 2014/0095790 A1* | 4/2014 | Chambliss | G06F 3/0683 711/117 |
| 2014/0236887 A1 | 8/2014 | Nelson | |
| 2014/0279892 A1 | 9/2014 | Bourbonnais | |
| 2015/0032695 A1* | 1/2015 | Tran | G06F 16/273 707/625 |
| 2015/0095287 A1 | 4/2015 | Spyker | |
| 2015/0269215 A1 | 9/2015 | Lehouillier | |
| 2015/0278314 A1 | 10/2015 | Fuglsang | |
| 2015/0347551 A1* | 12/2015 | Shang | G06F 16/273 707/615 |
| 2016/0110439 A1 | 4/2016 | Hrle | |
| 2016/0203180 A1* | 7/2016 | Hanai | G06F 16/2455 707/758 |
| 2017/0017677 A1 | 1/2017 | Jolfaei | |
| 2017/0031908 A1 | 2/2017 | Liu | |
| 2017/0039093 A1* | 2/2017 | Lin | G06F 9/5083 |
| 2017/0060695 A1* | 3/2017 | Clare | G06F 16/27 |
| 2017/0116210 A1 | 4/2017 | Park | |
| 2017/0212891 A1 | 7/2017 | Pundir | |
| 2017/0269974 A1 | 9/2017 | Arora | |
| 2017/0286472 A1 | 10/2017 | Cadarette | |
| 2017/0286475 A1 | 10/2017 | Cadarette | |

OTHER PUBLICATIONS

Kifer et al., "Detecting Change in Data Streams", Department of Computer Science, Cornell University, Proceedings of the 30th VLDB Conference, Toronto, Canada, 2004, pp. 180-191, <http://www.cse.psu.edu/~duk17/papers/change.pdf>.

Wulkan, Mike, "IBM InfoSphere Data Replication's Change Data Capture, Version 10.2.1 (Oracle), Performance Evaluation and Analysis", 2014, printed on Jan. 14, 2014, IBM Infosphere Change Data Capture, pp. 1-21.

"Push-Down of Data Change Detection in Relational Database Systems", An IP.com Prior Art Database Technical Disclosure, Authors et al.: IBM, Original Publication Date: Nov. 4, 2008, IP.com No. 000176076, 4 pages.

Cadarette et al., "Supplementing Change Streams", U.S. Appl. No. 15/090,634, filed Apr. 5, 2016, 30 pages.

* cited by examiner

SUPPLEMENTING CHANGE STREAMS

BACKGROUND OF THE INVENTION

The present invention relates generally to change streams, and more particularly to supplementing change streams.

Replication is the process of sharing database objects and data to multiple databases. To maintain replicated database objects and data in multiple databases, a change to one of these database objects at a database is shared with the other databases. In this way, the database objects and data are kept synchronized at all of the databases in the replication environment. In a replication environment, the database where a change originates is called the source database, and a database where a change is shared is called a target database.

SUMMARY

Aspects of the present invention disclose a method, computer program product, and system for analyzing change stream data. The method includes identifying, by one or more computer processors, a list of changes in a replication stream. The method further includes determining, by one or more computer processors, if one or more changes in the list of changes matches a criteria for a hint. The method further includes in response to determining that one or more of the changes in the list of changes matches the criteria for a hint, inserting, by one or more computer processors, the hint into the list of changes prior to a first change of the one or more changes that triggers a match in criteria.

Another embodiment of the present invention discloses a method for analyzing change stream data. The method includes identifying, by one or more computer processors, a pattern of changes in a replication stream. The method further includes identifying, by one or more computer processors, a total number of changes in the pattern of change that occur on a first database. The method further includes determining, by one or more computer processors, if one or more changes on a second database, wherein the one or more changes on the second database is less than the total number of changes, can be implemented to create a same outcome on the second database as the outcome of the total number of changes on the first database. The method further includes in response to determining that the one or more changes to the second database is less than the total number of changes to the first database and creates the same outcome on the second database as the total number of changes on the first database, inserting, by one or more computer processors, a hint prior to a first change in the pattern of changes in the replication stream indicating the determined one or more changes should be implemented on the second database.

DETAILED DESCRIPTION

Embodiments of the present invention recognize that the ability to push data changes into a destination is frequently a bottleneck for the performance of a change data replication solution. When a bottleneck does not allow for throughput that matches the rate of changes occurring on the source system, then the target can become latent, significantly impacting the business value of the target system.

Embodiments or the present invention recognize that currently a user must select the best strategy for dealing with a bottleneck based on the user's knowledge of the workload. The user may need to adjust the strategy as the user's workload changes. Embodiments of the present invention recognize that the emergence of new high performance streaming analytics engines create an opportunity to analyze a change stream before the data reaches the apply phase so as to provide real time guidance to the apply phase regarding the optimal strategy.

Implementation of embodiments of the invention may take a variety of forms, and exemplary implementation details are discussed subsequently with reference to the Figures.

Figure 1:
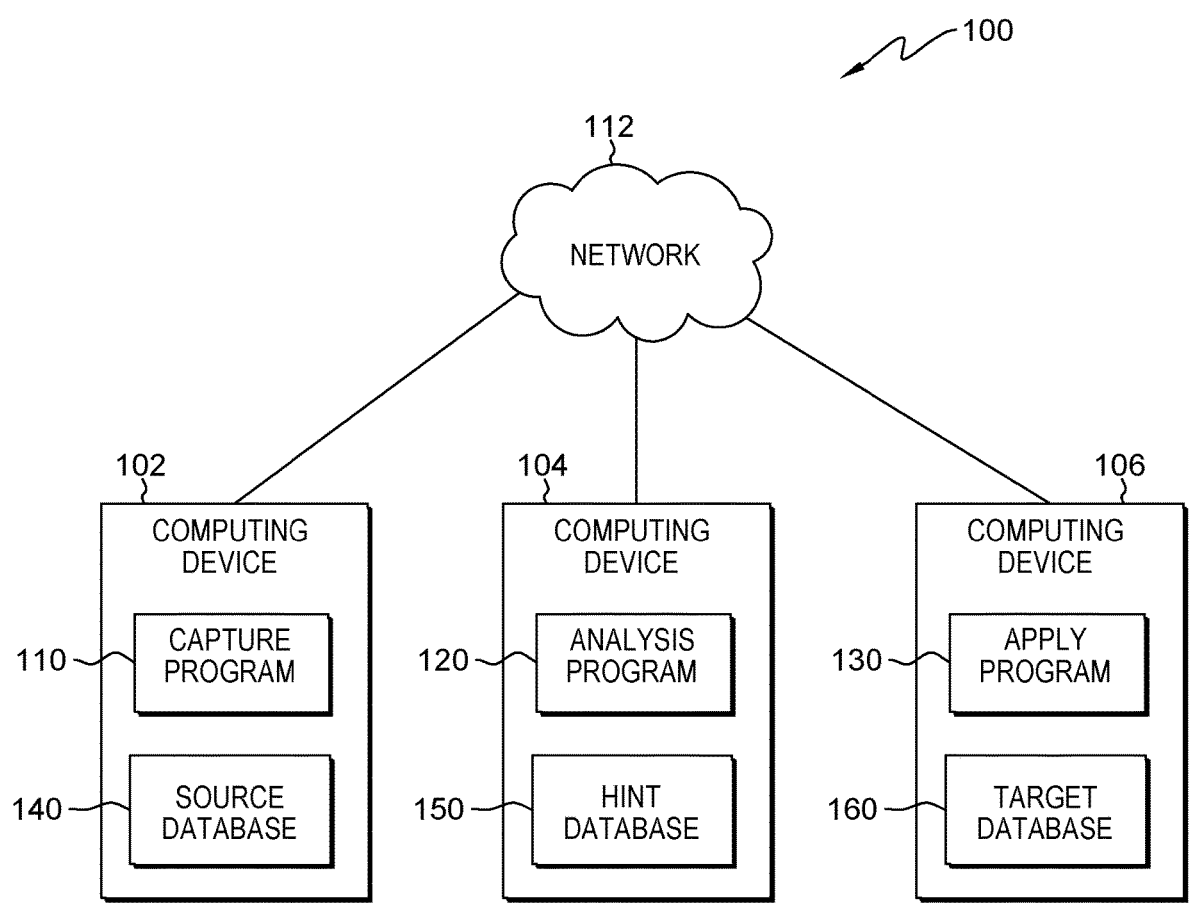
FIG. 1 is a functional block diagram illustrating a distributed data processing environment, in accordance with one embodiment of the present invention.

The present invention will now be described in detail with reference to the Figures. FIG. 1 is a functional block diagram of computing system 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted environment, computing system 100 includes computing device 102, computing device 104, and computing device 106 connected to network 112. Network 112 may be a local area network (LAN), a wide area network (WAN), such as the Internet, a cellular data network, any combination thereof, or any combination of connections and protocols that will support communications between computing device, in accordance with embodiments of the invention. Network 112 may include wired, wireless, or fiber optic connections. Network 112 includes one or more wired and/or wireless networks that are capable of receiving and transmitting data, voice, and/or video signals, including multimedia signals that include voice, data, and video information. Computing system 100 may have other devices not shown that are able to communicate with computing device 102, computing device 104, and computing device 106 via network 112.

Computing device 102 may be any computing device, such as a management server, a web server, a desktop computer, a laptop computer, a netbook computer, a smart phone, or a tablet computer. In general, computing device 102 may be any electronic device or computing system capable of processing program instructions, for sending and receiving data with network 112. In other embodiments, computing device 102 may represent a server computing system utilizing multiple computers as a server system, such as in a cloud computing environment. In the depicted embodiment, computing device 102 contains capture program 110 and source database 140. In some embodiments, computing device 102 may include additional programs, databases, or interfaces which are not depicted. In some embodiments, computing device 102 may be connected to multiple different computing device (not depicted) that send change instructions to computing device 102 indicating changes to be made on source database 140. For example, computing device 102 is connected to multiple other computing devices via network 112, some of which change source database 140. Computing device 102 is depicted and described in further detail with respect to FIG. 3.

In depicted computing system 100, capture program 110 resides on computing device 102. In some embodiments, capture program 110 may reside on another computing device, but oversees changes to source database 140 via network 112. In some embodiments, capture program 110 logs changes to a source database (e.g., source database 140) as changes occur. For example, capture program 110 creates a log, also known as a queue, of each change to source database 140. In various examples, capture program 110 may capture changes to source database 140 in real time, as the request for changes are received, as the changes are performed, etc. In some embodiments, capture program 110 may send changes to a target database (e.g., target database 160). In an example, program 110 receives multiple changes to source database 140 from multiple different computing devices (not depicted), implements the changes to source database 140, creates a list of changes which have occurred, and then sends the changes to computing device 106 to be applied to target database 160. In other embodiments, computing device 102 may have other programs for receiving change requests, performing changes to source database 140, and/or sending changes to computing device 106. In some embodiments, changes for source database 140 are being received from multiple other computing device (not depicted) by computing device 102 faster than computing device 102 can forward those change request to computing device 106, but capture program 110 logs all changes to source database 140 as the changes occur.

Source database 140 may be a repository that may be written to and/or read by capture program 110, and analysis program 120. In an embodiment, local database 140 is an organized collection of data. In some embodiments, source database 140 is a remote database for multiple users of multiple computing devices, all sharing and using the same stored information. In some embodiments, source database 140 may contain tables of information which are in constant flux as users of other computing devices (not depicted) change various items and entries stored in source database 140. In some examples, a user of another computing device (not depicted) may change a single entry, a row, a column, multiple rows, an entire table, etc. In various embodiments, other programs (not depicted) or other computing devices (not depicted) may store or change information on source database 140. In various embodiments, capture program 110 may identify changes that occur in source database 140 and log the changes. In some embodiments, analysis program 120 may also identify changes that occur in source database. In other embodiments, source database 140 may reside on a server, another computing device (not depicted), or independently as a standalone database that is capable of communicating with computing device 102, computing device 104, and computing device 106 via network 112.

Computing device 104 may be any computing device, such as a management server, a web server, a desktop computer, a laptop computer, a netbook computer, a smart phone, or a tablet computer. In general, computing device 104 may be any electronic device or computing system capable of processing program instructions, for sending and receiving data with network 112. In other embodiments, computing device 104 may represent a server computing system utilizing multiple computers as a server system, such as in a cloud computing environment. In the depicted embodiment, computing device 104 contains analysis program 120 and hint database 150. In some embodiments, computing device 104 may include additional programs, databases, or interfaces which are not depicted. In some embodiments, computing device 104 may be connected directly to computing device 102 prior to computing device 102 connecting to network 112. In other embodiments, computing device 104 is connected to computing device 102 via network 112. Computing device 104 is depicted and described in further detail with respect to FIG. 3.

In depicted computing system 100, analysis program 120 resides on computing device 104. In some embodiments, analysis program 120 may reside on another computing device, but monitors the change log created by capture program 110 via network 112. In various embodiments, analysis program 120 is monitoring a log of changes created by capture program 110 and identifying possible hints that match occurrences with the log created by capture program 110. In some embodiments, analysis program 120 identifies multiple occurrences that match hints stored in hint database 150, and then inserts hints into the log created by capture program 110 to be implemented on target database 160. In some embodiments, analysis program 120 may have hundreds or even thousands of changes to monitor, and analysis program 120 insert hints into the created log or queue after the changes have already been implemented on target database 160.

In some embodiments, analysis program 120 resides beside a change stream (e.g., a log of changes to a database that is sent to another database to replicate the same changes also known as a replication stream), acting as a multiple reader of the change stream. If analysis program 120 determines a hint may be useful, analysis program 120 inserts the hint into the stream at the appropriate point (e.g., before the changes that are impacted/reflected by the hint). In some embodiments, apply program 130 may not wait for a hint, and therefore, analysis program 120 may insert hints that provide no benefit because apply program 130 has already read past the point of the inserted hint in the change stream.

Hint database 150 may be a repository that may be written to and/or read by analysis program 120. In an embodiment, hint database 150 is an organized collection of data. In some embodiments, hint database 150 may contain hints, which include procedures to be utilized by a program (e.g., apply program 130) applying changes to a target database (e.g., target database 160) to reduce the amount of changes to implement on a target database from a source database, but still resulting in the same end product. For example, analysis program 120 reviews a log or queue of changes to source database 140 and references hint database 150 to determine if any changes or sequences of changes matches any protocols stored in hint database 150. In some embodiments, hint database 150 may include multiple possible sequences that equate to multiple possible hints. In some embodiments, hint database 150 may reside on a server, another computing device (not depicted), or independently as a standalone database that is capable of communicating with computing device 102, computing device 104, and computing device 106 via network 112.

Some example hints may include a command (e.g., to delete an entire table) based upon a sequence identified in an incoming data stream. One example of a hint may include transaction dependencies. For example, information regarding previous transactions, which have data dependencies on others transaction (e.g. change the same row of a table), allow an apply program to create parallel streams of independent transactions that can be applied without synchronization and with no risk of row deadlocks. In another example, a hint may be a simple batch transaction. For example, batch jobs often create large transactions with a single type of operation (e.g. 10,000,000 inserts caused by a single INSERT AS SELECT statement). Such transactions can be applied in parallel. Another example hint may include table reorganizations. For example, some transactions will not actually result in changes to the table data, but instead record internal operations that were done to reorganize data in the source table to improve efficiency. In some examples, the capture program is able to identify the reorganization transactions but not universally. A hint may include ignoring the transaction. Yet another example hint may include relative table load. For example, the load across several tables will change over time. An apply program can often optimize performance based on tying a given table to a given apply thread, which works best when each apply thread will get an equivalent amount of work. Analysis program 120 may include multiple hints that allow the apply program to spread the tables across the threads to get an even balance.

Computing device 106 may be any computing device, such as a management server, a web server, a desktop computer, a laptop computer, a netbook computer, a smart phone, or a tablet computer. In general, computing device 106 may be any electronic device or computing system capable of processing program instructions, for sending and receiving data with network 112. In other embodiments, computing device 106 may represent a server computing system utilizing multiple computers as a server system, such as in a cloud computing environment. In the depicted embodiment, computing device 106 contains apply program 130 and target database 160. In some embodiments, computing device 106 may include additional programs, databases, or interfaces which are not depicted. In some embodiments, computing device 106 is connected to computing device 102 via network 112. Computing device 106 is depicted and described in further detail with respect to FIG. 3.

In depicted computing system 100, apply program 130 resides on computing device 106. In some embodiments, apply program 130 may reside on another computing device, but applies changes in a source database (e.g., source database 140) to a target database (e.g., target database 160). In some embodiments, apply program 130 may monitor changes to a source database, and apply the changes to a target database. In other embodiments, apply program 130 may receive a queue of changes previous captured by another program (e.g., capture program 110) and apply the received changes to a target database. In yet other embodiments, apply program 130 may query another program for a log of changes to a source database and then apply the same changes to a target database. In various embodiments, apply program 130 may lag behind a capture program, as the apply program has to adjust the target database each individual change at a time, as opposed to block changes which may be applied to a source database.

In an example, apply program 130 is currently maintaining four connections into the target database and some uncommitted changes applied already in each of these connections. Apply program 130 is currently running in a mode using hash partitioning on key values to distribute rows across the connections. Apply program 130 then encounters a hint indicating the following set of N operations was the result of a single update statement. Apply program 130 may have a heuristic algorithm that determined N was very large (e.g. 1,000,000), and then the right strategy could take advantage of the hint about the single update statement. Apply program 130 may first need to commit all the 4 connections to target database 160 (e.g., as the update statement might affect rows that had been already touched in each or any of the connections), and then use one of the connections to run the update statement. In an example of a small N (e.g., 100), apply program 130 is probably more efficient avoiding the extra commit, and continuing the strategy of fanning out the 100 operations against the 4 connections, thereby ignoring the hint. In various examples, apply program 130 does not need to apply the hints. In an example, several hints are available and apply program may choose between the various hints.

Target database 160 may be a repository that may be written to and/or read by apply program 120. In an embodiment, target database 160 is an organized collection of data. In some embodiments, target database 160 is a remote database for backup purposes of a source database. In other embodiments, target database 160 may be a different type of database utilized for logical replication. In some embodiments, target database 160 may contain tables of information, which may change as changes are made to a source database. In some embodiments, target database 160 may not be an exact replica of a source database. For example, target database 160 is a target database for multiple source databases. In another example, target database may lag in replicating changes because apply program 130 is not keeping pace with changes made to source database 140. In other embodiments, target database 160 may reside on a server, another computing device (not depicted), or independently as a standalone database that is capable of communicating with computing device 102, computing device 104, and computing device 106 via network 112.

Figure 2:
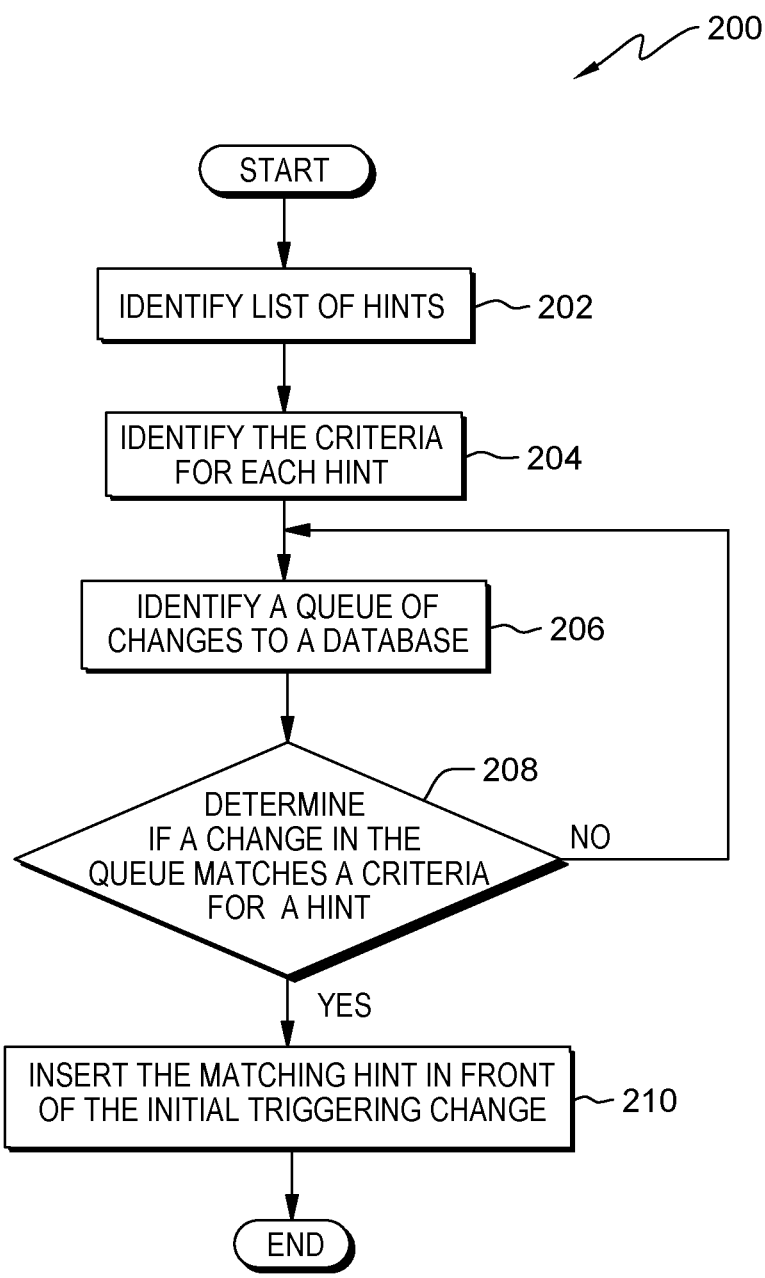
FIG. 2 depicts a flowchart depicting operational steps of a program for supplementing change streams for logical replication, executing within the computing system of FIG. 1, in accordance with one embodiment of the present invention.

FIG. 2 is a flowchart depicting operational steps of program 200, which is a function of analysis program 120, in accordance with an embodiment of the present invention. In some embodiments, the operational steps of program 200 begin at the prompt of an administrator. In other embodiments, the operational steps of program 200 begin in response to a backlog amount of time between updates to a target database and changes which occurred to a source database. In yet other embodiments, program 200 is constantly running.

Program 200 identifies a list of hints (step 202). In various embodiments, program 200 may receive multiple hints from an administrator to store in a database (e.g., hint database 150). In other embodiments, program 200 may receive hints from another computer or program (e.g., a cognitive program that creates hints based upon analysis of changes to a database). In yet other embodiments, program 200 may not store or receive hints, but rather identify hints located in a database (e.g., hint database 150). In some embodiments, hints may be stored on multiple computing devices, and program 200 identifies each possible hint to be applied. In some example, program 200 may search for a flag or label which identifies a hint. For example, all hint may start with the same word, sequence, or label.

In some embodiments, administrators may configure hint priorities. For example, if a hint is indicated as important and that transactional atomicity must be maintained, then hints about transaction dependency would be very important. In the example, the hint may have a priority number, and a threshold number must be reached to include a hint. In another example, if a hint is indicating maximum performance is more important, even if small windows may exist where transactional atomicity occurs, program 200 may ignore the possible hint.

Program 200 identifies the criteria for each hint (step 204). In various embodiments, program 200 identifies the criteria of each of the identified hints from step 204. For example, program 200 identifies that a hint states, "delete row table", which is triggered by multiple sequential deletes in the same row of a source database. In some embodiments, a single action may identify a specific hint. For example, a change stream only contains a specific entry if a specific hint is to apply. For the purposes of this application the words entry, operation, or action can be used interchangeably. In another embodiment, a single entry in a change stream may invoke the possibility of multiple hints. In one example, the criteria may be the last N rows (e.g., 15 rows in the stream) have been and Insert operation for the same table. In another example, criteria may be the latest transaction makes changes on rows that were previously changed in transactions x and y.

Program 200 identifies a queue of changes to a database (step 206). In some embodiments, program 200 identifies a change stream from a source database to a target database. For example, program 200 identifies a continuous stream of changes entered on source database 140 captured by capture program 110 and sent to apply program 130. In other embodiments, program 200 identifies various chunks of data which have been changed on a source database. In various embodiments, program 200 identifies chunks of changes in a change stream. In other embodiments, program 200 continuously monitors a change log or queue of capture program as the changes occur. In some embodiments, program 200 may search for the largest set of changes that match the pattern. As an example, a pattern might be a series of Delete operations on the same table, and program 200 is identifying a change that isn't a Delete for that table. Program 200 can group all the operations together up until just before the different one which creates the biggest contiguous set of Deletes.

Program 200 determines if a change in the queue matches a criterion for a hint (decision 208). In various embodiments, program 200 continuously monitor a change stream searching for criteria that trigger a hint. In some embodiments, program 200 may have preset priorities for hints. For example, a user may select hints which are more common or save more time, and program 200 may search for criteria which triggers the high priority hints first. In some embodiments, program 200 searches through the change stream from step 206 and takes note of whether the current change could be part of a chunk of changes that could benefit from a hint. In an example, whenever program 200 identifies a second operation that is of the same type (Insert, Update or Delete) and for the same table (e.g. Insert on Table 1) then program 200 is beginning to see a chunk that could potentially be identified as part of a simple batch transaction or the result of a single original operation. When program 200 identifies an operation of a different type or for a different table then program 200 identifies that the chunk would now be complete. Once program 200 has a complete chunk then program 200 will analyze that chunk to determine if the chunk matches a criterion for a hint.

In some embodiments, program 200 determine if a change matches criteria for a hint based upon machine learning. For example, program 200 may recognize the same changes repeating and determine which hints may be valid based upon user feedback. In another embodiment, program 200 may track the amount of lag time between an apply program updating a target database and changes occurring to a source database. Program 200 may determine certain hints reduce the lag, and insert the determined hints more frequently. In other embodiments, program 200 may have cognitive computing abilities, which can recognize patterns as originating from a single action. In other embodiments, program 200 may work in conjunction with another computing device that has cognitive computing abilities that can recognize and determine patterns and determine matches to possible hints.

In some embodiments, program 200 may identify repeatable access patterns in the change stream. If program 200 identifies repeatable access patterns, program 200 may send a notification to an administrator to review or store the information in hint database 150 as a possible trigger for a hint. In other embodiments, program 200 may not send the repeatable access patterns to an administrator but rather store them as a trigger for a hint. For instance, if a distinct pattern always starts with a fixed set of Update/Insert/Delete (UID) operations to the same set of tables, program 200 may determine the earliest possible subsequence. The hint can be stored which would enable the hint to be applied immediately. In an example where a match is a false positive, the false positive is detected and result in some re-application (or forward recovery) operations may be stored in hint database 150. In some embodiments, program 200 may consider many candidate hints at any time, (e.g., program 200 keeping track of a specific chunk of triggering actions independently from other candidate hints triggering actions).

In some embodiments, program 200 may determine matching based on matching a pattern involving a number of changes (i.e., entries in the change stream). For example, with the addition of the next change from the change stream, are there any patterns of changes that satisfy the criteria for a hint. In some embodiments, criteria for a hint may be a pattern of changes in a change stream. For example, a pattern of changes may be 15 rows deleted from a table consisting of 15 rows. Program 200 may determine that the deletion of 15 rows means the entire table has been deleted. Program 200 may determine that if a hint is added prior to the first change (e.g., deletion of row 1) which indicates deleting the entire table, an apply program may not have to take as many actions to accomplish the same goal. In this example, program 200 may insert a hint indicating an apply program should delete an entire table, and the hint is input in the change stream prior to the first delete action in the pattern of changes. If program 200 determines that a match in the criteria for a hint does not exist (no branch, decision 208), then program 200 returns to step 206.

If program 200 determines that a change in the queue matches a criteria for a hint (yes branch, decision 208), then program 200 inserts the matching hint in front of the initial triggering change (step 210). In various embodiments, program 200 inserts hints into a change stream prior an apply program passing the point of the hint. In one embodiment, program 200 adds additional hint information into the copy of the stream that program 200 publishes as output. In the embodiment, program 200 ensures that program 200 only performs analysis and delays moving data from the input to the output when a sufficient amount of data already exists in the output stream that an apply program has not read so as to ensure that the apply program is not starved.

In various embodiments, after program 200 determines a match exists, program 200 inserts the matching hint into the stream at the appropriate point (i.e., the point prior to the first triggering action of the hint). In some embodiments, an apply program may not wait for a hint, therefore, program 200 may insert hints that provide no benefit because the apply program has already read past that point in the change stream.

In some embodiments, a section of actions may have several hints, all of which are relevant, that an apply component might choose from. As an example, there may be a chunk of operations which are hinted as being a batch update on Table 1, and program 200 provides a hint as the exact source SQL statement that might have been run to cause all those updates. In some embodiments, program 200 may flag certain hints as higher priority based upon user setting or past performance.

Figure 3:
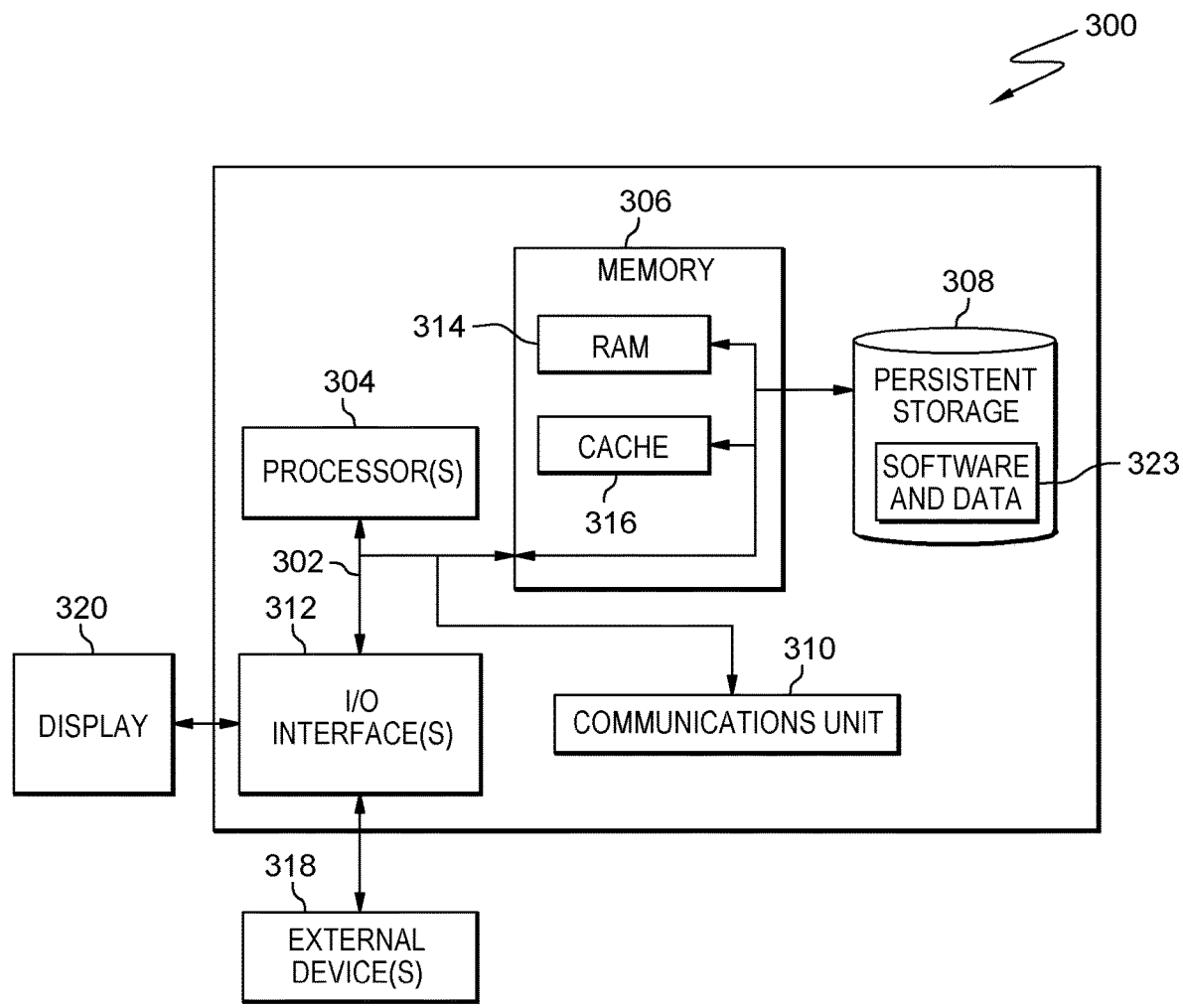
FIG. 3 depicts a block diagram of components of the server and/or the computing device of FIG. 1, in accordance with another embodiment of the present invention.

FIG. 3 depicts computer system 300, which is an example of a system that includes components of computing device 102, computing device 104, and/or computing device 106. Computer system 300 includes processor(s) 304, cache 316, memory 306, persistent storage 308, communications unit 310, input/output (I/O) interface(s) 312, and communications fabric 302. Communications fabric 302 provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of processor(s) 304 by holding recently accessed data, and data near recently accessed data, from memory 306.

Program instructions and data used to practice embodiments of the present invention may be stored in persistent storage 308 and in memory 306 for execution by one or more of the respective processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface(s) 312 may provide a connection to external device(s) 318, such as a keyboard, a keypad, and/or some other suitable input device. External device(s) 318 can also include portable computer readable storage media such as, for example, thumb drives, portable optical or magnetic disks, and memory cards. Software and data used to practice embodiments of the present invention, e.g., analysis program 120, source database 140, hint database 150 target database 160, and capture program 110 can be stored on such portable computer readable storage media and can be loaded onto persistent storage 308 of computing device 104 via I/O interface(s) 312 of computing device 104. Software and data 323 used to practice embodiments of the present invention, e.g., analysis program 120, can be stored on such portable computer readable storage media and can be loaded onto persistent storage 308 of computing device 104 via I/O interface(s) 312 of computing device 104. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for analyzing change stream data, the method comprising:
    identifying, by one or more computer processors, a list of changes in a replication stream;
    determining, by one or more computer processors, whether one or more changes in the list of changes matches criteria for a hint by determining a repeatable access pattern, stored as a trigger for the hint, occurred for the one or more changes in the list of changes, wherein the repeatable access pattern includes a fixed set of update, insert, and delete operations applied to a fixed set of tables;
    responsive to a determination that the one or more of the changes in the list of changes matches the criteria for the hint, inserting, by one or more computer processors, the hint into the list of changes prior to a first change of the one or more changes that triggers a match in the criteria, wherein inserting the hint into the list of changes includes determining the hint, wherein the hint reduces the amount of lag time, includes a relative table load, and ties one or more tables to one or more apply threads, and wherein each of the one or more apply threads receives a number of the one or more tables to balance the relative table load across the one or more apply threads;
    determining, by one or more computer processors, whether one or more changes on a second database can be implemented to create a same outcome on the second database as an outcome of a total number of changes on the first database, wherein the one or more changes on the second database are implemented using less actions than a total number of actions used to implement the total number of changes to the first database; and responsive to a determination that the one or more changes to the second database is less than the total number of changes to the first database and creating the same outcome on the second database as the outcome of the total number of changes on the first database, inserting, by one or more computer processors, the hint prior to a first change in a pattern of changes in the replication stream indicating that the determined one or more changes should be implemented on the second database, wherein the hint includes an instruction for reducing the amount of changes needed in the second database to match changes made to the first database.

2. The method of claim 1, wherein identifying, by one or more computer processors, a list of changes in a replication stream comprises:

identifying, by one or more computer processors, a list of changes occurring on the first database, wherein the list of changes in the first database are sent to the second database.

3. The method of claim 1, wherein determining, by one or more computer processors, whether one or more changes in the list of changes matches criteria for a hint comprises:

identifying, by one or more computer processors, criteria of one or more preset hints;

reviewing, by one or more computer processors, the list of changes in a replication stream; and determining, by one or more computer processors, if the identified criteria of the one or more preset hints matches the reviewed list of changes in the replication stream.

4. The method of claim 1, wherein the criteria for a hint comprise one or more specific changes in the list of changes that occur in a specific sequence.

5. The method of claim 3, wherein identifying, by one or more computer processors, criteria of one or more preset hints comprises:

identifying, by one or more computer processors, a pattern of changes in the identified list of changes; and determining, by one or more computer processors, if the pattern of changes matches the criteria for one or more preset hints.

6. The method of claim 1, wherein identifying the list of changes in the replication stream further comprises:

identifying, by one or more computer processors, a first sequence of changes in the list of changes;

determining, by one or more computer processors, if a total number of changes in the sequence of changes in the list of changes could be reduced in a new sequence of changes by fewer than the total number of changes to result in a same outcome of changes; and creating, by one or more computer processors, a new hint that matches the new sequence of changes.

7. The method of claim 6, wherein, the created new hint comprises a new sequence of changes and a criteria for the created new hint is the first sequence of changes in the list of changes.

* * * * *